Patented June 6, 1933

1,912,591

UNITED STATES PATENT OFFICE

ROBERT R. OLIN, OF AKRON, OHIO, ASSIGNOR OF ONE-HALF TO CHARLES P. HALL, OF AKRON, OHIO

RUBBER COMPOUNDING

No Drawing. Application filed February 7, 1930. Serial No. 426,593.

The present invention relates particularly to the manufacture of sponge rubber, although it is not necessarily confined to that particular form of vulcanized rubber, and, as will be brought out herein, the invention may be used in other branches of the rubber industry.

In the manufacture of sponge rubber, as heretofore practiced, it is necessary either to mill the rubber excessively, that is for a much longer period than is necessary or advisable in the manufacture of other species of rubber goods or to use in the batch large amounts of softeners that adversely affect the physical properties of the cured sponge. The excessive milling or softening is necessary in order to break down the structure of the rubber, so as to secure a satisfactory blowing in the subsequent vulcanization. By the methods heretofore practiced uniform distribution of the blowing agent throughout the mass of rubber is attained with difficulty and in commercial practice the distribution is usually imperfect.

The present invention has for its object the reduction of the milling period for rubber which is intended and compounded for the manufacture of sponge rubber so that the batch of rubber remains on the mill for a period comparable to that employed in the compounding of rubber for other purposes. The process therefore results in a very considerable economy in the manufacture of sponge rubber articles, and gives a much improved product.

This object is obtained in the process to be described by the addition of a particular softening agent or class of agents which secure the thorough plastication of the rubber in a short period and not only do not adversely affect the physical properties of the cured sponge rubber but in fact improves the physical properties, i. e. aging resistance, tensile strength and elongation properties, and flexibility and resilience.

The agents which are employed in connection with the preparation of sponge rubber, are also valuable in the manufacture of other rubber goods where a soft, flexible rubber is desired as for dipped rubber goods, either as solutions of rubber or as dispersions thereof, such as latex or artificial water dispersions of rubber.

In the preparation of the rubber for the manufacture of sponge rubber there are a number of agents which may be employed and which have been used with more or less satisfactory results. For example, there have been employed in the perfection of the invention such agents as ethyl lactate, ethyl oxybutrate, amyl acetate, ethyl acetate, dibutyl phthalate, and butyl acetate. The most satisfactory results, however, have been obtained by the use of the nitrogen compounds of primary, secondary or tertiary alcohols, such as the commercial tri-ethanolamine. It has been found that these compounds continue the plastication of the rubber mix during aging after removal of the thoroughly worked rubber batch from the mill.

The commercial tri-ethanolamine which has given excellent results is generally impure, being a mixture of tri- di- and mono-ethanolamine, with approximately the following percentages:

| | Percent |
|---|---|
| Tri-ethanolamine | 75–80 |
| Di-ethanolamine | 15–20 |
| Mono-ethanolamine | 0–5 |

This is not by any means a fixed ratio of the various constituents of the commercial compound, and variations therein will not affect the results except possibly in degree. The ethanolamines are accelerators of a milder form, and this property is not injurious to the results sought.

In the use of the various plasticizing agents for reducing the period of milling, it is advisable to combine certain of them with a carrier by which it may be properly milled and for this purpose an oil, jelly, or powder, or a mixture of these may be employed. While the range of oils, jellies or powders is not to be restricted, it has been found that a mixture of petrolatum and sodium bicarbonate is especially valuable as a carrier. When the blowing agent is a powder such as sodium bicarbonate, this serves as a carrier of the plasticizer and other powders need not be used.

The sodium bicarbonate when used with an oil or jelly is held in suspension in the oil or jelly and the thorough distribution of that agent in the batch of rubber is secured. In fact, it is believed that the present inventor is the first to use an oil or jelly carrier such as petrolatum including a powdered blowing agent.

With the other ingredients of the paste which is employed it is advisable to use any of the well known anti-oxidants, such for example, as diphenylethylene-diamine.

As typical examples of compounds suitable for the milling operation, the following may be taken, although it is to be understood that the proportions may be changed. Of these formulas, that known as A has given the best results as indicated by practical use, while B is an excellent agent for the purpose.

|  | A | B |
| --- | --- | --- |
| Petrolatum | 20% | 11½% |
| Bicarbonate of soda | 72% | 69% |
| Plasticizing agent | 4% | 17% |
| Anti-oxidant | 4% | 2½% |

The above proportions represent possible ranges between which the process is practical and are given with the standard or commercial tri-etholamine and not with a chemically pure product. It is possible that if the commercial manufacture of these products in a chemically pure state is perfected, that changes in the formulas will be found necessary, all of which is within the knowledge of those skilled in the art.

In the preparation of rubber for the manufacture of other rubber goods such as dipped goods, the admixture of the plasticizing agents will be found to be beneficial, and this is particularly true in the manufacture of dipped goods from latex by the known processes.

If it is desired to omit the plasticizing agent, a successful distribution of the blowing agent is possible using the following formula:

| | Percent |
| --- | --- |
| Petrolatum | 22 |
| Bicarbonate of soda | 73 |
| Anti-oxidant | 5 |

As used, the admixture, in either form, is an oily paste, usually white in color. It will not melt down too rapidly upon the mill for satisfactory milling.

A standard batch which may be employed either in the manufacture of sponge rubber sheets or balls is composed as follows:

| | Pounds |
| --- | --- |
| Smoked sheets | 100 |
| Zinc oxide | 10 |
| Sulphur | 4 |
| Petrolatum | 2.5 |
| Oleic acid | 5 |
| Sponge paste as described above | 21.75 |

In the manufacture of other articles, the various proportions and ingredients may be changed as dictated by usual or well known factory operations.

In milling, the rubber should be worked on the mill until it sheets out smoothly and then the sponge paste added and the milling continued until a thorough compounding is obtained. This normally requires only about eight minutes. After milling the rubber is removed and aged for approximately 48 hours so that the plasticizing agent will distribute itself uniformly through the batch. With the particular plasticizing agents disclosed herein it has been found that during aging the plastication progresses and at the end of the aging period the compound is substantially more plastic than when removed from the mill. After the requisite aging the batch is again placed on the mill and the balance of the compounding ingredients added. It is then aged for approximately 24 hours and is ready for the usual preparation and vulcanization.

The operation of milling is very greatly reduced over previous methods and the other advantages are such as to make the present invention a valuable aid in the manufacture of sponge rubber articles, dipped goods, or other rubber goods where a similar softness of the rubber is required.

What is claimed is:

1. The process of manufacturing sponge rubber consisting in incorporating in the rubber during the milling operation a plasticizing agent adapted to cause further plastication of the rubber while aging after milling, permitting the rubber to age and then adding the necessary ingredients for vulcanization.

2. That method of compounding rubber which comprises dispersing in a carrier of powdered material a plasticizer adapted to cause further plastication of the rubber while aging after milling, adding the mixture to a rubber batch and milling, and aging said batch after milling.

3. That method of compounding rubber which comprises dispersing in a mixture of a powdered material and a liquid or plastic vehicle a plasticizer adapted to cause further plastication of the rubber while aging after milling, adding the mixture to the rubber batch and milling, and aging said batch after milling.

4. The process of manufacturing vulcanized sponge rubber comprising compounding with the rubber during the milling operation, a softening agent comprising a mixture of oil or jelly and powdered materials as a carrier, a plasticizing agent adapted to cause further plastication of the rubber while aging after milling, and an anti-oxidant, aging said batch after milling and then vulcanizing said sponge rubber.

5. The process of manufacturing vulcanized sponge rubber comprising compounding with the rubber during the milling operation, a softening agent comprising a mixture of oil or jelly and powdered materials including a blowing agent as a carrier, a plasticizing agent adapted to cause further plastication of the rubber while aging after milling, and an anti-oxidant, aging said batch after milling and then vulcanizing said sponge rubber.

6. The process of manufacturing vulcanized sponge rubber comprising compounding with the rubber during the milling operation in a carrier including powdered material, a plasticizer adapted to cause further plastication of the rubber while aging after milling, aging said batch after milling and then vulcanizing said sponge rubber.

7. The process of manufacturing vulcanized sponge rubber comprising compounding with the rubber during the milling operation, a plasticizer adapted to cause further plastication of the rubber while aging after milling, and a blowing agent in a liquid or plastic carrier, aging said batch after milling and then vulcanizing said sponge rubber.

8. The process of manufacturing vulcanized rubber articles comprising adding triethanolamine as a plasticizer to a vulcanizable rubber compound, milling said compound, aging said compound after milling to increase the plasticization thereof, forming the compound into rubber articles, and vulcanizing said articles.

9. The process of manufacturing vulcanized rubber articles comprising adding an ethenolamine in a liquid or plastic carrier during the breaking down of the rubber upon the mill and aging said mixture after breaking down and before vulcanization to increase the plasticization thereof.

10. The process of manufacturing vulcanized rubber articles comprising adding triethanolamine in a paste during the breaking down of the rubber upon the mill, and aging said mixture after breaking down and before vulcanization to increase the plasticization thereof.

11. The process of manufacturing vulcanized sponge rubber comprising adding an ethenolamine and a blowing agent in a jelly to the rubber as it is broken down on the mill, and aging said mixture after breaking down and before vulcanization to increase the plasticization thereof.

12. The process of manufacturing vulcanized sponge rubber comprising adding triethanolamine and a blowing agent in a jelly to the rubber as it is broken down on the mill, and aging said mixture after breaking down and before vulcanization to increase the plasticization thereof.

13. The process of manufacturing vulcanized sponge rubber comprising adding triethanolamine, an anti-oxidant and a blowing agent in a jelly to the rubber as it is broken down on the mill, and aging said mixture after breaking down and before vulcanization to increase the plasticization thereof.

14. The process of manufacturing vulcanized rubber articles comprising adding during the milling operation to a vulcanizable rubber compound as a plasticizer an ethanolamine, aging said compound after the milling operation, and then vulcanizing said compound.

15. That process for making vulcanized rubber which comprises adding to a rubber batch a plasticizer adapted to cause further plasticization of the rubber while aging, milling said batch of rubber, then aging said rubber batch to increase the plasticization thereof, and thereafter vulcanizing said rubber.

16. That process for making vulcanized rubber which comprises mixing with a rubber a plasticizer adapted to cause further plasticization of the rubber while aging, aging said rubber after the mixing operation to increase the plasticization thereof, and thereafter vulcanizing said rubber.

ROBERT R. OLIN.